United States Patent
Kimelman et al.

(10) Patent No.: US 7,068,545 B1
(45) Date of Patent: Jun. 27, 2006

(54) DATA PROCESSING APPARATUS HAVING MEMORY PROTECTION UNIT

(75) Inventors: Paul Kimelman, Alamo, CA (US); Richard Roy Grisenthwaite, Cambridge (GB); David James Seal, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 11/028,501

(22) Filed: Jan. 4, 2005

(51) Int. Cl.
*G11C 7/00* (2006.01)

(52) U.S. Cl. .................................. 365/189.01; 365/49

(58) Field of Classification Search .......... 365/189.01, 365/49; 712/225
See application file for complete search history.

(56) References Cited

U.S. PATENT DOCUMENTS

| | | | |
|---|---|---|---|
| 6,021,476 A | | 2/2000 | Segars |
| 6,519,690 B1 | | 2/2003 | Quimby |
| 6,697,276 B1 | * | 2/2004 | Pereira et al. ................. 365/49 |
| 6,901,505 B1 | * | 5/2005 | McGrath .................... 712/225 |

FOREIGN PATENT DOCUMENTS

| | | |
|---|---|---|
| EP | 0 425 771 A2 | 5/1991 |
| EP | 0 425 771 A3 | 5/1991 |

\* cited by examiner

*Primary Examiner*—Son T. Dinh
(74) *Attorney, Agent, or Firm*—Nixon & Vanderhye P.C.

(57) ABSTRACT

A data processor (100) has a memory operable to store data values; a memory protection unit (130) operable to associate memory attributes with portions of said memory and to identify a plurality of memory regions corresponding to respective address ranges of said memory. The memory protection unit is operable to associate with at least one of the plurality of memory regions (150) a respective memory region specifier comprising an attributes field (230) for defining a set of memory attributes associated with said memory region and a sub-region field (240) for holding a sub-region membership value. The sub-region membership value specifies, for each of a plurality of sub-regions of the memory region, whether respective sub-regions (160-1 to 160-8) are member sub-regions or non-member sub-regions such that said memory attributes are applied to said member sub-regions but are not applied to said non-member sub-regions.

24 Claims, 11 Drawing Sheets

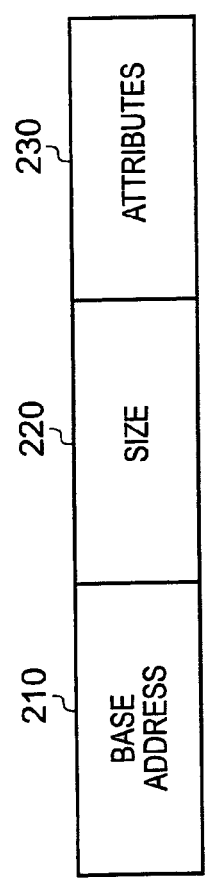
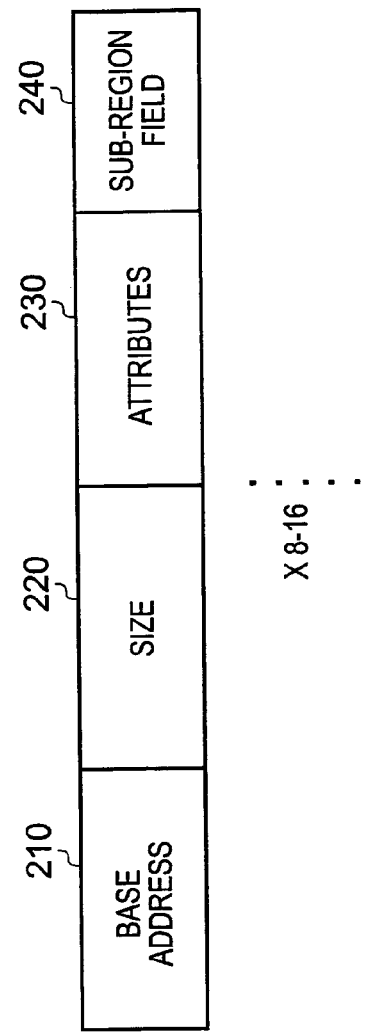
Fig. 2A PRIOR ART
Fig. 2B

CURRENT ADDRESS   $A_7\ A_6\ A_5\ A_4\ A_3\ A_2\ A_1\ A_0$

MASK WORD   $M_7\ M_6\ M_5\ M_4\ M_3\ M_2\ M_1\ M_0$

SELECT BITS   $S_7\ S_6\ S_5\ S_4\ S_3\ S_2\ S_1\ S_0$ $S_i = A_i\ \text{AND}\ M_{i+3}\ \text{AND}\ \overline{M}_i$   ← 710

$F_0 = S_0\ \text{or}\ S_3\ \text{or}\ S_6$ $F_1 = S_1\ \text{or}\ S_4\ \text{or}\ S_7$ $F_0 = S_2\ \text{or}\ S_5$

$F_0 = A_3$; $F_1 = A_1$; $F_2 = A_2$ $Log_2$ (size)=4    4% 3=1

S = 0 0 0 0 0 $A_2$ $A_1$ $A_0$ $F_0 = A_0$; $F_1 = A_1$; $F_2 = A_2$ $Log_2$ (size)=3    3% 3=0

$F_0 = A_3$; $F_1 = A_4$; $F_2 = A_2$ $Log_2$ (size)=5    5% 3=2

$F_0 = A_3$; $F_1 = A_4$; $F_2 = A_5$ $Log_2$ (size)=6    6% 3=0

Fig. 8D

DATA PROCESSING APPARATUS HAVING MEMORY PROTECTION UNIT

BACKGROUND OF THE INVENTION

1. Field of the Invention

This invention relates to data processing systems. More particularly, this invention relates to data processing systems having memory protection units.

2. Description of the Prior Art

It is known to control memory access in data processing systems using memory protection units. These memory protection units define a plurality of protection regions whose properties are configured by writing to protection unit registers. This provides a level of control over memory properties and enables different memory regions with different attributes to be specified. Memory protection units are similar to memory management units, but are simpler in the sense that they do not involve mapping of virtual to physical addresses. Furthermore, memory protection units do not use translation tables, but limit themselves to a relatively small number of regions in hardware to improve the predicatability of response.

It is also known to program memory protection units to have two or more overlapping memory regions. Overlapping regions increase the flexibility of how the memory regions can be mapped onto physical memory devices in the data processing system. However, in order to simplify the implementation cost there are usually certain constraints on the way that memory regions can be allocated. The size of a memory region must be a power of two and can range, for example, from 250 B up to 4 GB. However, the starting address of the memory region is constrained to be multiple of the region size, that is, for a region of size $2^n$ the starting address must be $k*2^n$ where k is an integer. This means that it is not possible in such systems to define memory regions of arbitrary size. Although, systems having arbitrary sized memory regions can be built, it is much more expensive to do so. Memory protection units typically offer in the range of eight to sixteen different memory regions.

Due to the constraint on the way that memory regions are allocated in known systems it may be necessary to allocate more than one memory region with a respective set of memory attributes to define a memory block of a given size as required by a processing apparatus. This is because the memory attributes must be applied to the entire memory region.

Furthermore, the delineation of memory regions by known memory protection units is particularly inflexible in situations where application processes running on the data processing apparatus require access permission to different groups of peripheral devices. This difficulty arises from the situation that typically a contiguous block of memory will be allocated to a full set of peripheral devices. Due to the diverse nature of different application processes executed by the data processing apparatus, it is normal that different processes will require different sets of access permissions to different sub-sets of the peripheral devices in known memory units. To accommodate this situation, it is known to allocate to each individual peripheral device, a respective memory region. Since typically only eight to sixteen memory regions are provided, the demands from the limited number of regions are high and this has lead to a requirement for an increasing number of memory regions to be defined by the memory protection unit. Thus there is a need for a data processing apparatus that offers more flexibility than known memory protection units yet does not involve the overheads of introducing increasing large numbers of memory protection regions.

SUMMARY OF THE INVENTION

Viewed from one aspect the present invention provides apparatus for processing data, said apparatus comprising:

a memory operable to store data values;

a memory protection unit operable to associate memory attributes with portions of said memory and to identify a plurality of memory regions corresponding to respective address ranges of said memory, said memory protection unit being operable to associate with at least one of said plurality of memory regions a respective memory region specifier comprising an attributes field for defining a set of memory attributes associated with said memory region and a sub-region field for holding a sub-region membership value that specifies for each of a plurality of sub-regions of said memory region whether respective sub-regions are member sub-regions or non-member sub-regions such that said memory attributes are applied to said member sub-regions but are not applied to said non-member sub-regions.

The present technique recognises that allowing each memory region to be sub-divided into a plurality of individual sub-regions and providing in the memory region specifier associated with a memory region, a sub-region field for holding a sub-region membership value that specifies whether each of the sub-regions is a member sub-region, to which a defined set of memory attributes are applied or alternatively, a non-member sub-region to which the memory attributes associated with the memory region are not applied, provides a great deal of flexibility in the allocation of physical memory. The ability to associate a set of memory attributes to only specified portions of a memory region, that is individual sub-regions, allows the constraint whereby the starting address of a memory region must be an integer multiple of the memory region size to be overcome since, if it is desired to allocate a block of memory of a size for which it is not possible to define a whole memory region, it is still possible to allocate to that memory block a single memory region of a size larger than the required memory block but to specify as non-member sub-regions the portion of that larger memory region that is not required. The non-member sub-regions can then be utilised by other memory regions where they can be selected as member sub-regions.

The ability to select only certain sub-regions as member sub-regions also addresses the problem of inefficient usage of a memory region for each peripheral device. This is because different sub-regions of the single memory region can be associated with different ones of the full set of peripheral devices and the different access permissions to be granted to different application processes can be accommodated within a single memory region by simply allocating as member sub-regions those sub-regions associated with the given set of peripheral devices to which access is to be granted.

It will be appreciated that the set of memory attributes defined by the memory region specifier could be many and varied. In one embodiment the set of memory attributes comprises memory access permissions. Thus, certain sub-regions can be defined as read only, both read and write accessible or not accessible at all. In another embodiment the data processing apparatus comprises a plurality of levels comprising a user level and a privileged level and the memory access permissions specify in which of the plurality of levels access is permitted. Thus, for example, the user level of privilege may be available to the normal application process whereas on the occurrence of an exception access may be provided to the privileged level. Thus, for a certain memory region read only permission could be given for the user level access whereas both read and write permission could be provided for the privileged level access. This provides the flexibility of allowing higher levels of privilege to be granted less restricted access to certain memory regions such as those holding instructions and configuration parameters, than the access granted to such memory regions at the user level.

In a further embodiment, the set of memory attributes comprises an indication of whether the member sub-regions are cacheable or non-cacheable memory. Another alternative embodiment has memory attributes comprising an indication of whether the member sub-regions are bufferable or non-bufferable. This enables the programmer the ability to control any adverse affects associated with caching data or buffering data. For example, it may be desired to avoid allocating a memory sub-region to be cacheable or bufferable to prevent memory accesses occurring at times when a programmer would not expect or, alternatively, to avoid there being multiple physical locations where a data item can be held. Due to cache memory characteristics, certain memory-mapped input/output locations are unsuitable for caching. The ability to design certain sub-regions within a memory region that are cacheable/non-cacheable and certain sub-regions within a given memory region that are bufferable/non-bufferable provides the programmer with more flexibility enabling more efficient usage of the memory resources.

Sub-regions of a given memory region could be allocated as member sub-regions or non-member sub-regions in any possible number and combination, constrained only by the total number of available sub-regions. However, in one embodiment the sub-region field is used to specify a plurality of contiguous member sub-regions. This overcomes any limitations in the size of memory regions that can be defined by the memory protection unit since an equivalent of a memory region of non-standard size can be defined by selecting a larger than required memory region and selecting a contiguous group of sub-regions as member sub-regions and allocating the remaining contiguous block of sub-regions as non-member sub-regions. This effectively defines a memory region of intermediate size and avoids the requirement in known systems to form a memory region of non-standard size using two different memory regions with two separately defined sets of memory attributes.

In a different embodiment of the invention, the sub-region field is used to specify a plurality of non-contiguous member sub-regions. This provides much greater flexibility where it is desired to allocate to two different application processes access permission to different subsets of peripheral devices without consuming a whole memory region for each of the peripheral devices. This is achieved by associating a peripheral device with a sub-region so that a single memory region is associated with a set of peripheral devices. For different program applications, those sub-regions associated with peripheral devices to which access is to be permitted are defined as member sub-regions whereas those sub-regions associated with peripheral devices to which access is not to be permitted are defined as non-member sub-regions. Thus, more peripheral devices can be accommodated using a memory protection unit having a limited number of defined memory regions.

Although the plurality of memory regions of the memory protection unit could be contiguously defined memory regions having no overlap, in one embodiment of the invention the memory regions of the memory protection unit are overlapping memory regions. Thus, if a given sub-region lies within more than one memory protection region, then the memory attributes of, for example, the highest-numbered memory region can be applied to it. This is particularly useful in the system according to the present technique in which each memory region comprises a plurality of sub-regions that can be assigned as member sub-regions or non-member sub-regions. The non-member sub-regions can be assigned memory attributes by memory regions lying in a lower hierarchical level, which have defined that sub-region as a member sub-region. For example if a given portion of memory is allocated as a non-member sub-region in the highest-numbered memory region level, then its memory attributes will simply correspond to the attributes of the next highest memory region level for which that sub-region is defined as a member sub-region. In one particular embodiment, if a given address range of memory is specified by the sub-region field of one of the plurality of memory regions as a non-member sub-region, then that same given address range may also be specified by a sub-region field corresponding to a different one of the plurality of member regions as a member sub-region. This avoids that address range of memory being left without an assigned set of memory attributes.

In one embodiment of the invention the data processing apparatus is operable to execute the plurality of different processing applications having different memory address mappings. An example of such an apparatus is an apparatus capable of performing threaded execution of different processing applications. In this embodiment, in the event of a context switch between execution of different ones of the plurality of different processing applications, the memory protection unit is operable to update the sub-region field of at least one of the plurality of memory regions. This enables the memory attributes for each memory region to remain fixed yet enables different attributes to apply to different sub-regions by allocating different ones of the sub-regions of each member region as member sub-regions and non-member sub-regions. Thus, for example, if a sub-region of the highest-numbered memory region was previously allocated as a member sub-region yet after the context switch it was allocated as a non-member sub-region, then before the context switch the memory attributes of the highest memory region will apply to that sub-region whereas after the context switch the memory attributes of a different, lower-numbered memory region will apply to that same memory portion. In a further embodiment the memory protection unit is operable to update the attributes field in the event of the context switch. This allows the memory attributes of the given memory region to be changed to reflect the change in the memory usage requirements of the application process being executed.

Although the memory region could be divided into sub-regions of differing sizes, in some embodiments, the sub-regions of the memory region are designed to be of equal size. This simplifies allocation of sub-regions, for example, in allocating a given sub-region to a given peripheral device in the contiguous memory block corresponding to the set of peripheral devices.

It will be appreciated that the address-specifying portion of a current address word could be identified in the data processing apparatus in a variety of different ways. However, in one embodiment of the invention, an address mask is used to identify the address specifying portion of the current address word in dependence upon a size value specifying the size of the associated memory region. This enables efficient identification of the memory region to which a current memory address belongs.

In one embodiment the data processing apparatus comprises sub-region validity logic operable to determine a sub-region valid value that specifies whether the current memory location is associated with one of the member sub-regions or one of the non-member sub-regions. This provides a convenient means of identifying whether a given memory address corresponds to both a given memory region and a member sub-region of the given memory region.

It will be appreciated that the sub-region to which the current memory location belongs could be determined directly from the current address word value, together with the region size and address, as a separate determination for such sub-region and each region. However, this identification is more efficiently perfromed with a reduced area of circuitry by using an address mask based approach to identify to which of the plurality of regions the current memory location belongs, and to re-use the address mask to identify to which of the plurality of subregions of the identical region the current memory location belongs.

In a further embodiment the validity logic is operable to use the address mask to identify the particular sub-region by calculating a set of select bits by logically combining bits from the address mask and bits from the current address word. In yet a further embodiment the sub-region validity logic is operable to calculate a set of final select bits by logically combining different ones of the sets of select bits. This approach reduces the number of multiplexers required to determine from the current address word the sub-region with which the current address is associated. Thus it provides a convenient way of isolating those bits of the address that specify the particular sub-region to which that memory address corresponds.

In a further embodiment, the sub-region validity logic comprises permutation logic operable to permute the set of final select bits to calculate the sub-region valid value. In one embodiment the permutation logic is operable to permute the set of final select bits whereas in another alternative embodiment the permutation logic is operable to instead permute the sub-region membership value to calculate the sub-region valid value. These two embodiments provide alternative ways of recovering from the address mask the address bits that specify the appropriate sub-region of the corresponding memory region.

Although the permutation logic could perform the permutation of the sub-region membership value after storage of that sub-region membership value but before calculation of the sub-region valid value, in some embodiments of the invention the permutation logic is operable to perform the permutation when writing the sub-region membership value to an operand store. This provides for a more efficient logic circuit by combining the stage of permutation with the stage of writing of the sub-region membership value to memory.

It will be appreciated that the separate set of permutation logic could be provided to permute the sub-region membership value of each individual memory region. However, in an embodiment of the invention a single logic module is used to perform the permutation for each of the plurality of memory regions. This reduces the amount of circuitry required to manage the provision of the memory sub-regions.

Viewed from another aspect the present invention provides a method for processing data, said method comprising:

storing data values in a memory;

associating memory attributes with portions of said memory and identifying a plurality of memory regions corresponding to respective address ranges of said memory using a memory protection unit;

associating with at least one of said plurality of memory regions a respective memory region specifier comprising an attributes field for defining a set of memory attributes associated with said memory region and a sub-region field for holding a sub-region membership value that specifies for each of a plurality of sub-regions of said memory region whether respective sub-regions are member sub-regions or non-member sub-regions such that said memory attributes are applied to said member sub-regions but are not applied to said non-member sub-regions.

Viewed from a further aspect the present invention provides apparatus for processing data, said apparatus comprising:

means for storing data values;

memory protection means for associating memory attributes with portions of said memory and to identify a plurality of memory regions corresponding to respective address ranges of said memory, said memory protection means being operable to associate with at least one of said plurality of memory regions a respective memory region specifier comprising an attributes field for defining a set of memory attributes associated with said memory region and a sub-region field for holding a sub-region membership value that specifies for each of a plurality of sub-regions of said memory region whether respective sub-regions are member sub-regions or non-member sub-regions such that said memory attributes are applied to said member sub-regions but are not applied to said non-member sub-regions.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2A schematically illustrates a memory region descriptor of a known memory protection unit;

FIG. 2B schematically illustrates a memory descriptor according to the present technique and having a sub-region field;

FIG. 7 illustrates the formula used to calculate values corresponding to the outputs of circuit elements of FIG. 6;

FIGS. 8A to 8B illustrate example calculations of the circuit of FIG. 6;

FIGS. 8A to 8D illustrate example calculations of the circuit of FIG. 6;

DESCRIPTION OF THE PREFERRED EMBODIMENTS

Figure 1:
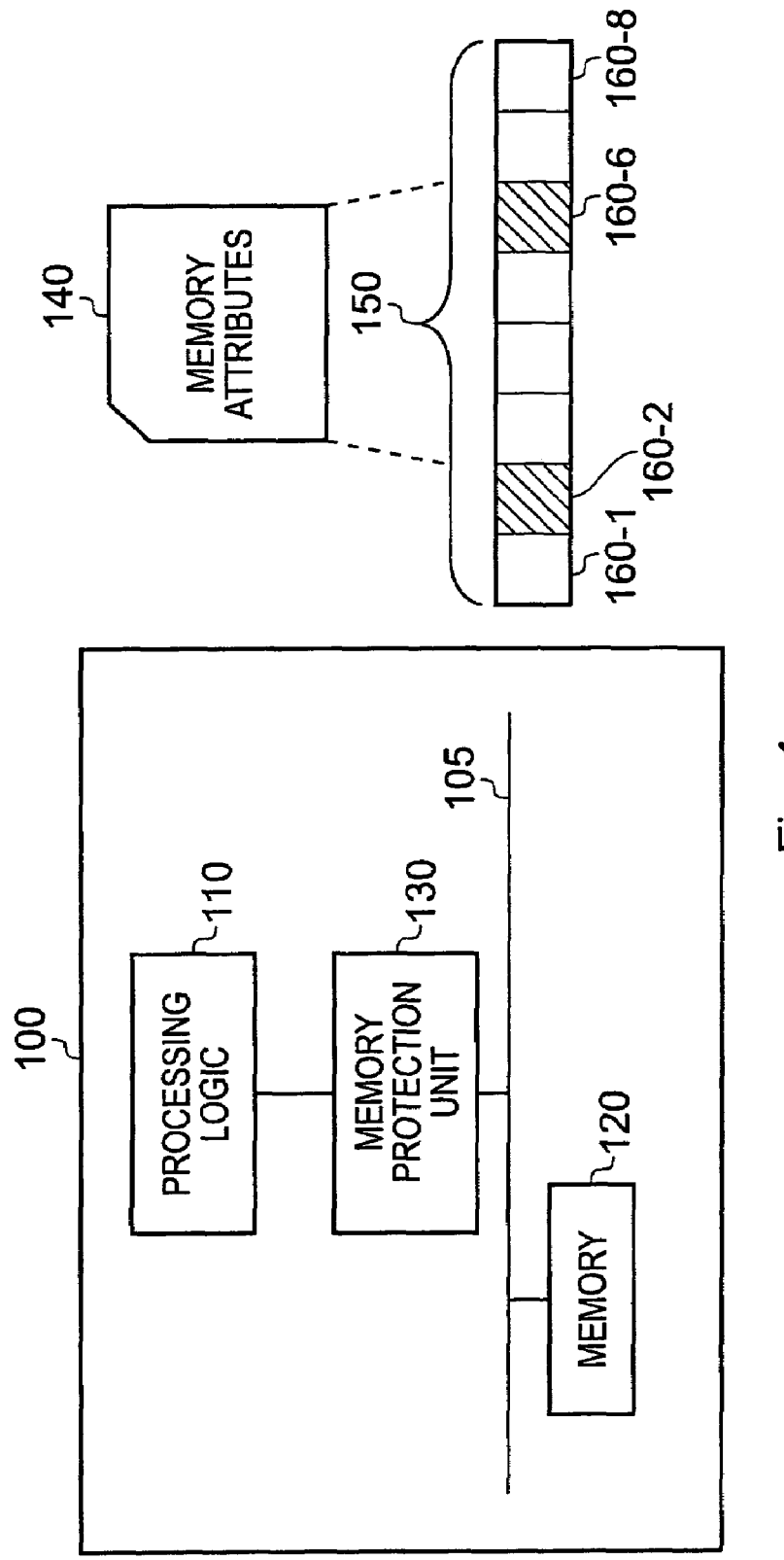
FIG. 1 schematically illustrates a data processing system having a memory protection unit.

FIG. 1 schematically illustrates a data processing apparatus according to the present technique. The data processing apparatus 100 comprises processing logic 110, memory 120 operable to store data and/or instructions and a memory protection unit 130. The memory 120 is connected to a bus 105 and the processing logic 110 is connected to the memory protection unit 130, which is in turn connected to the bus. The memory protection unit 130 provides a way of managing the memory 120 and defines a plurality of different memory regions having respective sets of memory attributes 140. The memory protection unit 130 manages the physical memory address space. The memory protection unit 130 defines attributes associated with each of the plurality of protection regions by writing to respective protection unit registers. The size of a memory region is $2^n$, where n is an integer and can the size range from 4 KB up to 4 GB. The starting address of a memory region is constrained in this embodiment to be a multiple of $2^n$. FIG. 1 shows a memory region 150, which is divided into a plurality of sub-regions 160-1 to 160-8. The set of memory attributes 140 is defined in relation to the entire memory region 150. However, a memory region specifier for the memory region 150 has a sub-region field for holding a sub-region membership value which specifies for each of the plurality of sub-regions 160-1 to 160-8, whether that sub-region is a member sub-region or a non-member sub-region. In FIG. 1 the member sub-regions are the shaded regions 160-2 and 160-6. The memory attributes 140 are applied by the memory protection unit 130 only to the member sub-regions and not to the non-member sub-regions.

The memory attributes 140 include: memory access permissions; an indication as to whether the memory region is readable and/or writable; an indication of whether the memory region is cacheable memory region; and an indication of whether the memory region is bufferable. The access permissions comprise a user level of access and a privileged level of access and the memory access permissions of the attributes field of the memory region specifier specify which one of those levels of access to the associated memory region is permitted. The privileged level of access enables less restricted access to memory, instructions and configuration parameters than does the user level and the processing logic 110 will switch from the user level to the privileged level, for example, in the event that an exception is generated. Since caches and write buffers change the number, type and timing accesses to main memory they are not suitable for storage of data associated with some types of memory location. For example, write buffers and write-back caches rely on it being possible to delay a store to memory 120 such that it actually occurs at a later time that a storage instruction was executed by the processing logic 110. This may not be appropriate for certain types of memory locations, such as memory-mapped interrupt/output locations. Thus, the memory protection unit 130 allows a given memory region to be designated as uncacheable, unbuffereable or both. The ability to specify sub-regions of memory as well as the coarser scale memory regions offers additional flexibility in memory resource management with regard to known memory protection systems.

FIG. 2A schematically illustrates a memory region specifier as used in known memory protection units. The memory region specifier comprises a base address field 210, a size field 220 and an attributes field 230. One such memory region specifiers is provided for each of the memory regions defined by the memory protection unit 130, which is typically in the range from 8 to 16. The base address field 210 specifies the address of the first byte of the associated memory region 150. The address of the first byte is required to be a multiple of the region size. Furthermore, in this arrangement there is a requirement for the memory region to be aligned to a multiple of its size, thus for a memory region of size $2^n$ the memory region should be aligned to be $k*2^n$, where k is an integer value. The size field 220 specifies the size of the associated memory region which in this arrangement, can be in the range from 250 bytes to 4 GB. The attributes field 230 specifies memory attributes associated with the memory region. These memory attributes comprise whether a user level or a privileged level of access is permitted; an indication as to whether the memory region is readable and/writable; an indication of whether the memory region is cacheable or non-cacheable and an indication of whether the memory region is bufferable or non-bufferable. In known memory protection systems, although the memory regions can vary in size, the memory attributes are associated only with the entire memory region with which the memory region specifier of FIG. 2A is associated.

FIG. 2B schematically illustrates a memory region specifier according to the present technique. The memory region specifier of FIG. 2B has three of the same fields as the known specifier of FIG. 2A (i.e. the base address 210, the size field 220 and the attributes field 230). However, the memory region specifier of FIG. 2B has an additional sub-region field 240, containing a multi-bit sub-region membership value that specifies for each of a plurality of sub-regions of the corresponding memory region, whether respective sub-regions of the memory region are member sub-regions or non-member sub-regions. The attributes specified in the attributes field 230 apply only to those sub-regions that are specified by the sub-region membership value as member sub-regions and the specified attributes do not apply to those sub-regions that are denoted non-member sub-regions. Thus, the memory region specifier of FIG. 2B enables a given memory region to be divided into sub-regions so that the attributes corresponding to the memory region, instead of being applied to the entire memory range of the region are instead applied to only a subset of the sub-regions as determined by the sub-region membership value. This flexibility may be provided without the requirement to increase the number of memory regions from the number of memory regions in known systems. Although in the embodiment of FIG. 2B, the memory attributes and sub-region membership value are specified in a descriptor, it will be appreciated that these values could be separately stored in different registers and retrieved by the memory protection unit 130.

Figure 3:
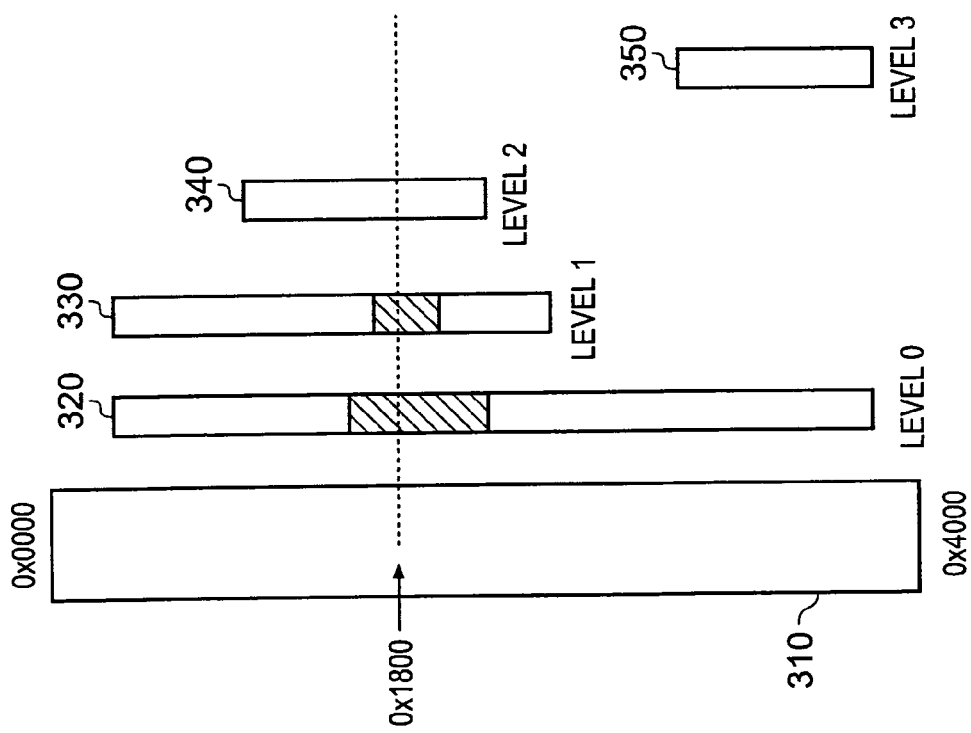
FIG. 3 schematically illustrates different memory regions of a memory protection unit operable to allocate overlapping memory regions.

FIG. 3 schematically illustrates how the memory regions managed by the memory protection unit 130 are arranged as overlapping regions. FIG. 3 shows a block of addresses 310 corresponding to physical memory addresses. In this example the address range shown is from 0x0000 (hexadecimal) to 0x4000. Also shown in FIG. 3 are a number of different memory regions 320, 330, 340, 350. It can be seen that there is some overlap in the physical memory address space between respective memory regions. Since it is required in this arrangement that each memory region is of size $2^n$ and aligned $2^n$, the smaller memory regions lie entirely within the larger regions if they overlap, as shown. For example, memory regions 320, 330 and 340 all comprise the address 0x1800. The shaded areas of respective memory regions in FIG. 3 represent member sub-regions whereas the un-shaded areas of the memory regions represent non-member sub-regions. It can be seen that the physical memory address 0x1800 corresponds to a member sub-regions of the memory region 320 and 330 but also corresponds to a non-member sub-region of the memory region 340. The overlapping memory regions increase the flexibility of how the different memory regions can be mapped onto physical memory devices in the data processing system. In order to effectively manage the overlapping regions, the memory protection unit 130 applies a fixed priority scheme to determine which memory region takes priority in defining the memory attributes to be applied to a given memory portion where the given memory portion falls within more than one of the plurality of memory regions. In particular, the attributes associated with the memory region having a higher priority level take priority over those attributes for the memory region having the lower priority level. In this example, the priority levels depend upon the arrangement of the memory regions as defined by the memory protection unit 130. Thus, in the example of FIG. 3, if memory region 320 is a level 0 region, memory level 330 is a level 1 region, memory level 340 is a level 2 region and memory level 350 is a level 3 region then it follows that since both memory region 320 and memory region 330 have member sub-regions including the address 0x1800, then the attributes specified for memory level 1 i.e. memory region 330 are applied preferentially to the memory attributes specified for memory level 0 i.e. memory region 320.

The overlapping properties of memory can also be used to specify a background region. For example, consider the case where the memory protection unit 130 has defined a number of memory regions that are sparsely distributed across a full 4 GB physical memory address space. If a programming error occurs and the processor issues an access request to a memory address that does not fall within any of the defined memory regions, then the memory protection unit 130 will ordinarily abort the memory access. However, by defining the memory region at level 0 to be a 4 GB background region that covers the entire physical memory address space, if the memory access does not fall into any of the other specified memory regions, then the access will be controlled by a set of default attributes that the user has programmed in to the memory region specifier for the memory region at level 0.

Figure 4B:
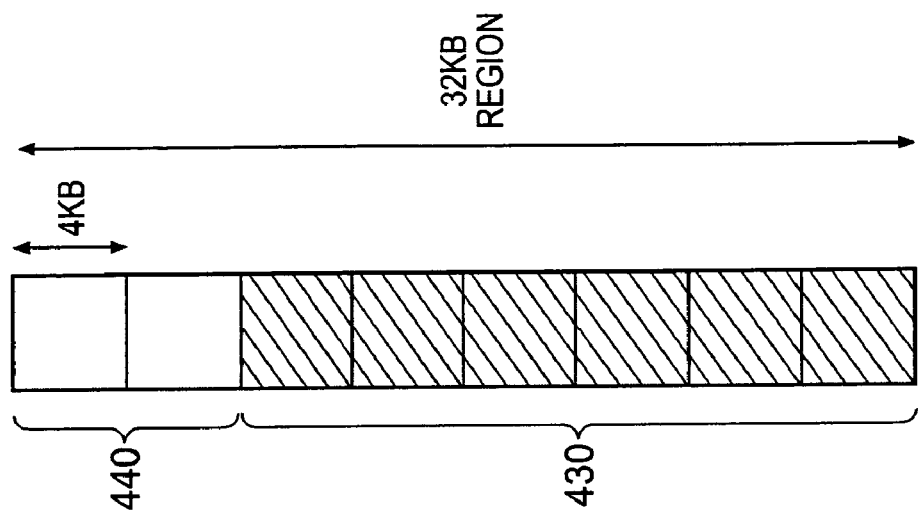
FIG. 4B schematically illustrates how a single memory region is used according to the present technique to specify the same memory block as specified by FIG. 4A.
Figure 4A:
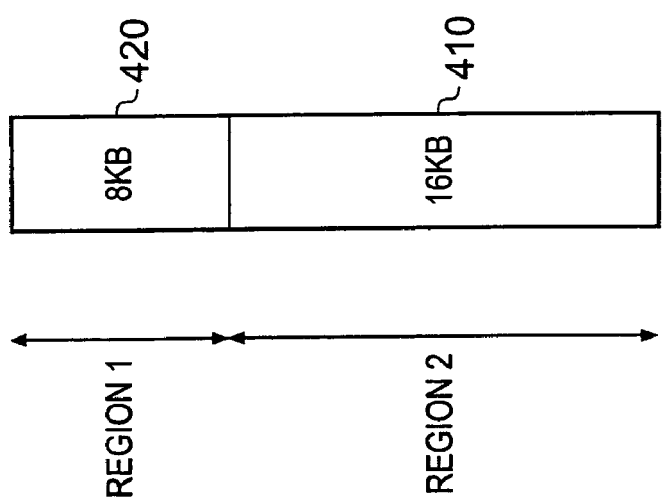
FIG. 4A schematically illustrates allocation of two distinct memory regions to specify a memory block of differing size.

FIGS. 4A and 4B schematically illustrate the additional flexibility offered by the present technique when specifying contiguous sub-regions within a memory region. Due to constraints on the sizes and base addresses of the memory regions implemented by the memory protection unit 130, that is, the constraint whereby the starting address of a memory region is a multiple of the size $2^n$ of the memory region, in known systems that specify only memory regions but do not allow memory sub-regions to be defined is not possible to allocate a memory region of arbitrary size. This situation is illustrated by the example of FIG. 4A, in which an application process requires allocation of a contiguous block of physical memory of size 24 KB. However, the memory protection unit 130 did not have the flexibility to allocate a memory region of size 24 GB and thus it was necessary to separately allocate two memory regions: the first memory region 410 of 16 KB in length and the second memory region 420 of 8 KB in length to make up the total memory block of 24 KB. The overhead associated with separately specifying two memory regions to allocate a contiguous block of 24 KB of memory is high since the attributes must be separately specified for each of the two memory regions.

By way of contrast, FIG. 4B illustrates how a 24 KB contiguous block of memory is allocated by the apparatus according to the present technique. The ability to divide the memory region into a plurality of sub-regions and specify for each of those sub-regions whether the memory region attributes should apply to that particular sub-region (using the appropriate bits of the sub-region membership value), it is possible to allocate a 24 KB portion of physical memory by allocating to the process a single 32 KB region and setting a number of sub-regions within that region to the member sub-regions and the remaining sub-regions to be non-member sub-regions. In particular, in the example of FIG. 4B, the 32 KB memory region is divided into eight equal sub-regions of 4 KB each in size. Thus, by allocating six contiguous 4 KB sub-regions as member sub-regions and the remaining two 4 KB sub-regions as non-member sub-regions, a 24 KB memory portion can be readily defined. The advantage of defining the 24 KB portion using the single region of FIG. 4B is that the memory attributes are associated with the entire 32 KB region and thus may be defined only once yet by using the sub-region field of the associate memory region specifier the memory attributes can be applied to only the required 24 KB portion of the 32 KB memory region.

Figure 5A:
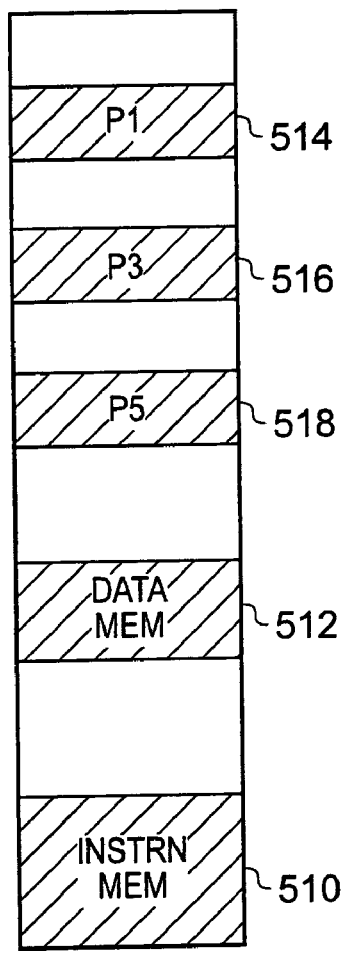
FIGS. 5A, 5B and 5C schematically illustrate memory management of access to different peripheral devices by different application processes running on a data processing system.
Figure 5B:
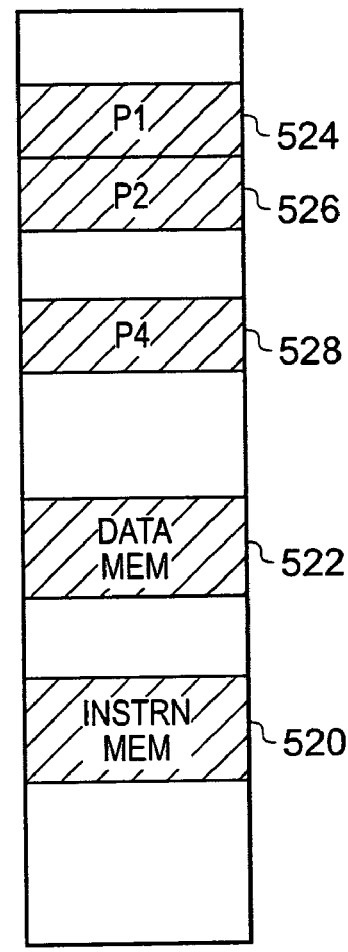
Figure 5C:
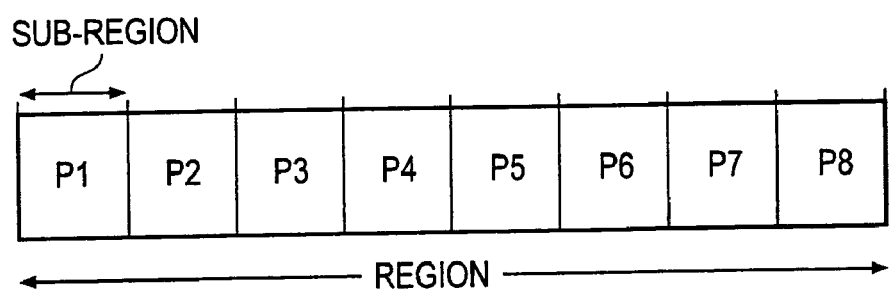

FIGS. 5A to 5C schematically illustrate allocation of different sets of member sub-regions to different sets of processing peripherals. FIG. 5A illustrates a full memory map for a first application process running on the processing logic 110 whereas FIG. 5B illustrates a full memory map for a second, different application process running on the processing logic 110. These application processes correspond to processing applications such as a word processing application, a spreadsheet application or a computer game application. In the example of FIGS. 5A to 5C, consider the case where a total of eight peripheral devices are provided by the data processing apparatus 100. Typically a contiguous block of memory will be allocated to all eight of the peripheral devices. However, process 1 of FIG. 5A and process 2 of FIG. 5B require a different set of access permission to different subsets of peripheral devices. For example, in the first process of FIG. 5A it is desired to enable access only to peripherals P1, P3 and P5 as indicated by the memory map portions 514, 516, 518 respectively. This first application process does not permit use of peripherals P2, P4 or P6 to P8. By way of contrast, the second application process of FIG. 5B permits access to a different subset of peripherals that is P1, P2 and P4 and does not permit access to the remaining peripherals P3 and P5 to P8. The memory map of FIG. 5A also shows a block of memory allocated to instructions 510 and a second block 512 of memory allocated to data storage. Similarly, the application process illustrated by the memory map of FIG. 5B comprises an instruction memory block 520 and a separate data memory block 522. Each data storage memory block 512, 522 and each of instruction memory blocks 510 and 520 may comprise one or more memory regions. The instruction memory 520 of the second application is non-overlapping with the instruction memory 510 of the first application.

In known systems comprising memory protection units, the requirement to provide access to different sub-sets of peripheral devices to different application processes is accommodated by separately allocating to each peripheral device a respective memory region. Since typically from eight to sixteen memory regions are provided, the data processing device can rapidly run out of the available memory regions when trying to accommodate a large group of peripherals and the different requirements of the different processing applications.

However, according to the present technique, a requirement to individually allocate respective memory regions to respective peripheral devices is conveniently avoided since it affords the flexibility of defining individual sub-regions for each memory region. Furthermore, each sub-region can be designated either a member sub-region to which the memory attributes associated with the region are actively applied or a non-member sub-region to which the memory attributes associated with the region are not actively applied. Thus, in the system of FIGS. 5A to 5C having a total of eight peripherals devices, the memory region shown in FIG. 5C is conveniently sub-divided into eight sub-regions so that each sub-region can be associated with a given peripheral device. Thus, in the application process illustrated in the memory map of FIG. 5A the requirement to permit access to only peripherals P1, P3 and P5 can be accommodated using a single memory region and by specifying sub-regions associated with P1, P3 and P5 as member sub-regions but specifying sub-regions associated with P2, P4 and P6 to P8 as non-member sub-regions. Similarly, in the memory map of the second application process illustrated in FIG. 5B where access to peripheral devices P1, P2 and P4 is required, this can be achieved by using a single memory region and specifying the sub-regions associated with P1, P2 and P4 as member sub-regions but specifying assigning sub-regions associated with P3 and P6 to P8 with non-member sub-regions. In this way, different subsets of the peripheral devices can be accessed by different application processes without consuming a memory region for each peripheral device. Rather a single memory region can be used together with member and non-member properties of sub-regions to specify different sets of peripheral access permissions for different processes.

In the event of a context switch between the first process and the second process the memory protection unit 130 is operable to update the sub-region field 240 of FIG. 2B for each memory region to change which of the sub-regions are member sub-regions for that memory region. Furthermore, the memory protection unit 130 could also update the attributes field 230 for one or more memory regions accommodate the change on demands on the system memory resulting from the context switch.

Figure 6:
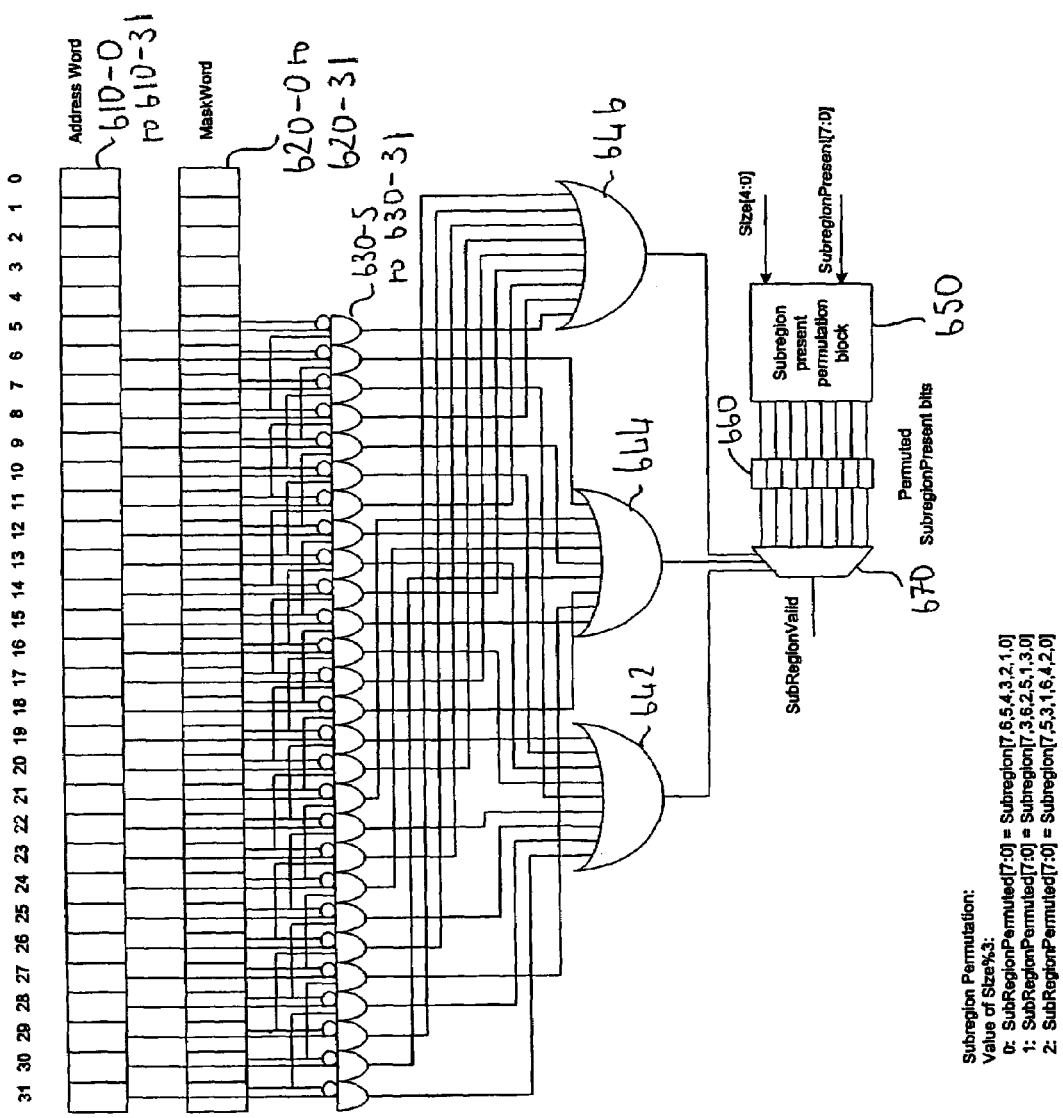
FIG. 6 schematically illustrates logic operable to calculate a sub-region valid bit.

FIG. 6 schematically illustrates a portion of sub-region validity logic operable to determine the sub-region valid bit that specifies whether a given sub-region is a member sub-region or a non-member sub-region. The logic arrangement comprises a first register 610 for storing a current address word, a second register 620 for storing a mask word, a set of twenty-seven AND gates 630-5 to 630-31, a set of three logical OR gates 642, 644 and 646; a sub-region membership value permutation block 650; a register 660; and a multiplexer 670.

The register 610 holds a 32-bit address word generated by the processing logic 110 whereas the register 620 holds an address mask word used to identify a relevant address-specifying portion of the current address word. The mask word stored in register 620 has a value that depends upon the size value 220 specified in the memory region specifier of FIG. 2B. The AND logic gates 630-5 to 630-31 are arranged to calculate respective select bits $S_i$. The AND gate 630-5, for example takes a first input from element five of the address word register 610, a second input from the eighth element of mask word register 620 and a third inverted input corresponding to the fifth register element of the mask word register 620. In general, the select bits $S_i$ for i=5 to 31 are given by the formula $S_i = M_{(i+3)} \cdot A_i \cdot \text{NOT}(M_i)$. [$S_i = M_{i+3} \cdot A_i \cdot \text{NOT}(M_i)$] The first OR gate receives as input values the select bits $S_{10}$, $S_{13}$, $S_{16}$, $S_{19}$, $S_{22}$, $S_{25}$, $S_{28}$, $S_{31}$. The second OR gate 644 takes as inputs the select bits $S_6$, $S_9$, $S_{12}$, $S_{15}$, $S_{18}$, $S_{21}$, $S_{24}$, $S_{27}$ and $S_{30}$ whereas the third OR gate 646 receives as inputs the select bits $S_5$, $S_8$, $S_{11}$, $S_{14}$, $S_{17}$, $S_{20}$, $S_{23}$, $S_{26}$ and $S_{29}$. Thus each of the OR gates 642, 644 and 646 receives as inputs subsets of the 27 select bits output by the AND gates 630-5 to 630-31 in which every third select bit output is supplied to a given OR gate. The outputs of the OR gates 642, 644 and 646 correspond to final select bits; denoted F-bits, which are used to determine to which of the eight possible sub-regions of FIG. 5C the memory location corresponding to the current address word belongs. The use of the three OR gates 642, 644, 646 to select groups comprising every third select bit from the AND gates 630-5 to 630-31 simplifies the processing logic, since otherwise an array comprising 24 multiplexers would be required. The three F-bits from the respective OR gates 642, 644 and 646 are supplied as select inputs to the multiplexer 670. The sub-region membership value permutation block 650 receives as input the size value of the size field 220 of FIG. 2B and an 8-bit sub-region membership value that specifies whether each of the sub-regions of the associated memory region is a member sub-regions or a non-member sub-region. The 8-bit sub-region membership value is permuted by the permutation block 650 before it is written to the register 660 and is then supplied as input to the multiplexer 670.

The output of the multiplexer 670 is a sub-region valid bit that specifies whether the current address word represents a memory location that belongs to a member sub-region. The permutation block 650 is required in this example embodiment due to the nature of the OR gate arrangement 642, 644, 646, which means that the F-bits that are output from those OR gates may represent a permutation of the ordering of the three address bits that specify to which of the eight possible sub-regions the current memory address corresponds. This will be more fully explained with reference to FIG. 7 and FIGS. 8A to 8D below.

FIG. 7 is an example that illustrates how the select bits and the F-bits are calculated in the circuitry of FIG. 6. In this simplified example the current address word is an 8-bit address word $A_i$, where i=0 to 7 and similarly the mask word is an 8-bit mask word $M_i$, where i=0 to 7. The select bits $S_i$, i=0 to 7 represent the outputs of the AND gates 630-5 to 630-31 of FIG. 6. The select bits are specified by the formula 710 as shown in FIG. 7 and each of the three F-bits are derived from logical combinations of different ones of the select bits. In particular, the first F-bit, $F_0$ is given by a logical OR operation performed on the select bits $S_0$, $S_3$, and $S_6$; the second F-bit $F_1$ is given by a logical OR operation performed on the S bits. $S_1$, $S_4$, and $S_7$; and the third F-bit $F_2$ is given by a logical OR operation having the inputs $S_2$ and $S_5$. This is similar to the calculation performed by the logical OR gates 642, 644 and 646 of FIG. 6 since the F bits in the example of FIG. 7 are calculated from select bits that are spaced apart by two intervening S bits or equivalently every third S-bit whilst in the circuit of FIG. 6, inputs to an OR gate are selected from every third logical AND gate.

FIGS. 8A to 8D give four specific examples of calculations of the F bits according to the formulae given in FIG. 7. In each of these four examples the select bits $S_i$ are calculated according to formula 710 and the non-zero select bits always correspond to the first three bits immediately following the end of the string of ones of the mask word M. In the example of FIG. 8A the mask word has four consecutive ones followed by four consecutive zeros in the lowest order bit positions. The select bits are calculated from formula 710 so that for example $S_1$ is equal to $A_1$ AND $M_4$ AND (NOT $M_1$)=$A_1$ AND 1 AND 1=$A_1$. Similarly, $S_0$ is equal to $A_0$ AND $M_3$ AND (NOT $M_0$)=A AND 0 AND 1=0. The other bits of the select word are calculated in a similar way. The final select bits $F_i$, are calculated according to the formulae given in FIG. 7 so that $F_0=S_0$ OR $S_3$ OR $S_6=0$ OR $A_3$ OR 0=$A_3$; $F_1=S_1$ OR $S_4$ OR $S_7 < A_1$ OR 0 OR 0=$A_1$; and $F_2=S_2$ OR $S_5=A_2$ OR 0=$A_2$. The F-bits of the further three examples of FIGS. 8B to 8D are calculated in a similar manner. The three F-bits together specify which one of the eight possible sub-regions the current address belongs to. However, due to the manner in which the F-bits are calculated using the logic circuit of FIG. 6 the address bits $A_i$ which specify the relevant sub-region within a given region may be permuted. To determine whether or not the F-bits are in fact permuted a calculation is performed to determine $\log_2(size)$ and the remainder of $\log_2(size)$ when divided by three, which will be denoted by the notation $\log_2(size) \% 3$ provides an indication of whether or not re-ordering is actually required. This calculation is simplified by noting that the value of $\log_2(size)$ in fact corresponds to the total number of zeros comprised in the mask word. Thus in the example of FIG. 8A the value of $\log_2(size)=4$ and 4% 3 is equal to 1. Since the value of the remainder is non-zero, this tells us that a particular permutation is required to recover the correct ordering of the three address bits that specify the sub-region. In the example of FIG. 8B the mask word comprises five consecutive ones, followed by three consecutive zeros in the lowest order bit positions. In this case the F-bits $F_0$, $F_1$ and $F_2$ correspond respectively to the address bits $A_0$, $A_1$ and $A_2$. Since there are three zeros in the mask word of FIG. 8B $\log_2(size)$ is equal to 3 so that the remainder in this case is 0 and no permutation is required. In FIG. 5C the mask word comprises three consecutive ones followed by five consecutive zeros in the lowest-order bit positions. In this case, as in the case of FIG. 8A, the F-bits are recovered in a permuted order. In particular, $F_0$, $F_1$ $_{and\ F2}$ are respectively equal to the address bits $A_3$, $A_4$ and $A_2$. In this case since the mask word has five zeros $\log_2(size)$ is equal to 5 and the remainder when divided by 3 is equal to 2 so that a permutation is required. Finally, in the example of FIG. 8D, the mask word is formed by two ones followed by six consecutive zero in the lowest-order six-bit positions and the F-bits are recovered in a non-permuted order indicated by the fact that $\log_2(size)$ is equal to 6 so that the remainder when divided by 3 is equal to zero. From the examples of FIGS. 8A to 8D it will be appreciated that the F-bits recovered from the circuits of FIG. 6 allow the isolation of the address bits that specify the appropriate sub-region corresponding to a given current address word. However, the F-bits may represent the sub-region specifying address bits $A_i$ in a permuted order so that this permutation must be compensated for.

Figure 9A:
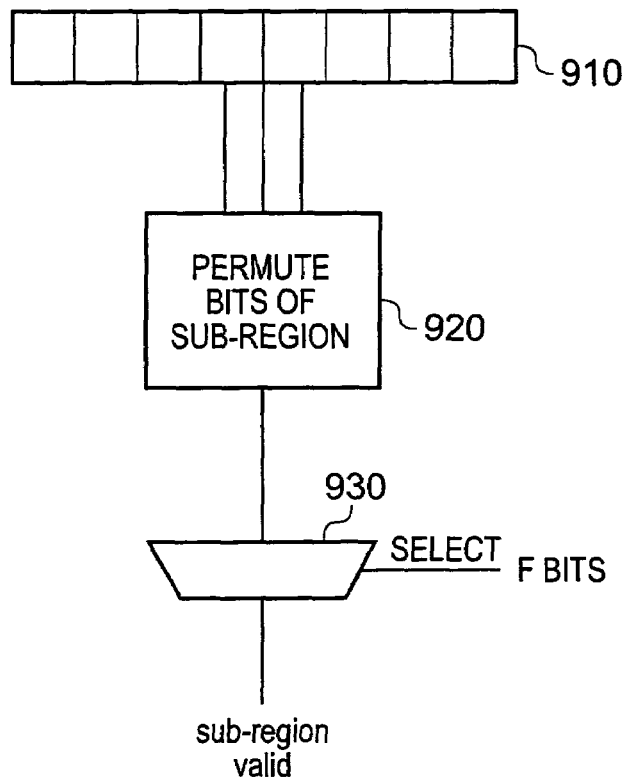
FIG. 9A schematically illustrates a portion of circuitry used to calculate a sub-region valid bit comprising logic to permute the sub-region membership value.

FIG. 9A is a first arrangement that is used to calculate the sub-region valid bit that is used to determine whether or not a given current address is in a sub-region that is a member sub-region. The arrangement comprises an 8-bit register 910 for storage of the sub-region membership value, a block of permutation logic 920 for permuting bits of the sub-region membership value and a multiplexer 930 operable to output the sub-region valid bit. This arrangement exploits the fact that the permutation to recover the correct order of the F-bits can be performed either on the sub-region membership value or on the F-bits themselves. The arrangement of FIG. 9A stores the unpermuted sub-region membership value in the register 910 and supplies the sub-region membership value to the permutation logic 920 where the 8-bit sub-region membership value is permuted in dependence upon the remainder of $\log_2(size)$ divided by 3. The permutation logic 920 outputs the permuted sub-region membership value to the multiplexer 930. The F-bits in a non-permuted order are supplied as select bits to the multiplexer 930 so that the output of the multiplexer indicates whether or not a given sub-region is a member sub-region or a non-member sub-region. The F-bits indicates the particular sub-region of the eight possible sub-regions to which the current address corresponds to whereas the sub-region valid value stored in register 910 indicates whether or not that particular sub-region is a member sub-region. The permutation logic 920 performs a permutation in dependence upon the value of $\log_2(size) \% 3$. The sub-region membership value remains unpermuted in the event that the remainder is 0. If the unpermuted sub-region membership value has the bit ordering [7, 6, 5, 4, 3, 2, 1, 0] then remainder of 1 results in the sub-region valid value bit-ordering [7, 3, 6, 2, 5, 1, 3, 0] whereas a remainder of value 2 results in the sub-region valid value bit-ordering of [7, 5, 3, 1, 6, 4, 2, 0]. The arrangement of FIG. 9A is analogous to the arrangement of FIG. 6 in that the sub-region membership value is permuted in both cases. However, in the arrangement of FIG. 6 the permutation is performed before the sub-region membership value is written to the register 660 whereas in the example of FIG. 9A the sub-region valid value is permuted after it is read out from the register 910 and before it is supplied to the multiplexer 930.

Figure 9B:
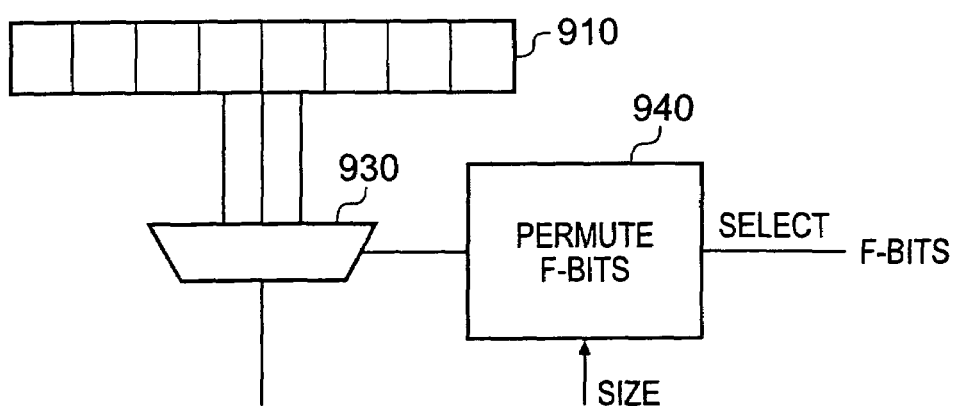
FIG. 9B schematically illustrates a portion of circuitry operable to calculate the sub-region valid bit having permutation logic operable to permute the final select bits.

FIG. 9B shows an alternative arrangement for calculation of the sub-region valid bit. This arrangement comprises similarly to FIG. 9A a register 910 for holding the 8-bit sub-region membership value, and a multiplexer 930. However, in this particular arrangement, rather than permuting the bits of the sub-region membership value after it is read out from the register 910, the sub-region membership value is supplied unpermuted directly to the multiplexer 930. Instead, the F-bits are permuted before they are supplied to the multiplexer 930. This permutation is performed by an F-bit permutation block 940. The F-bit permutation block 940 receives as input the unpermuted F-bits and performs a permutation in dependence upon the size of the memory region i.e. the value $\log_2(size) \% 3$. The nature of the permutation is described above in relation to FIGS. 8A to 8D. Again, similarly to FIG. 9A the output of the multiplexer 930 is the sub-region valid bit.

Figure 10:
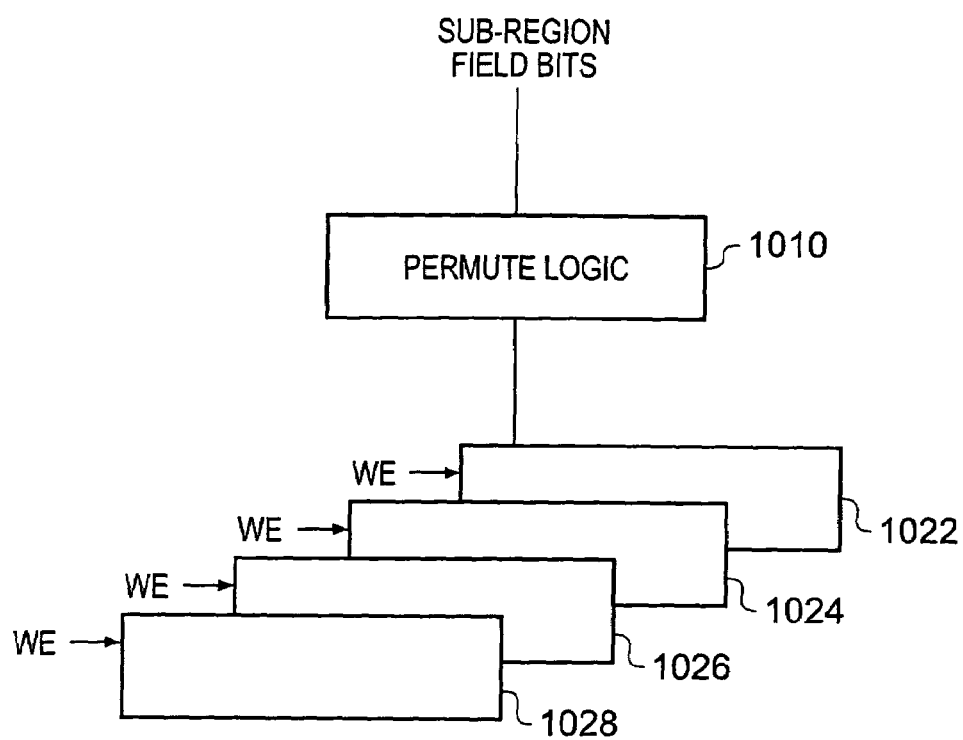
FIG. 10 schematically illustrates a single block of permutation logic operable to permute the sub-region membership values of a plurality of different memory regions.

FIG. 10 schematically illustrates an alternative arrangement for permuting the sub-region membership value in order to calculate the sub-region valid bit. In this arrangement a single permutation logic module 1010 is used to permute the sub-region membership values corresponding to each of the plurality of memory regions. In FIG. 10 the registers holding the 8-bit sub-region membership value are represented by block elements 1022, 1024, 1026 and 1028. All of these four registers are write enabled. This arrangement provides for efficient re-use of the same permutation logic block to permute the sub-region valid values corresponding to all of the registers holding the 8-bit sub-region membership value.

Figure 11:
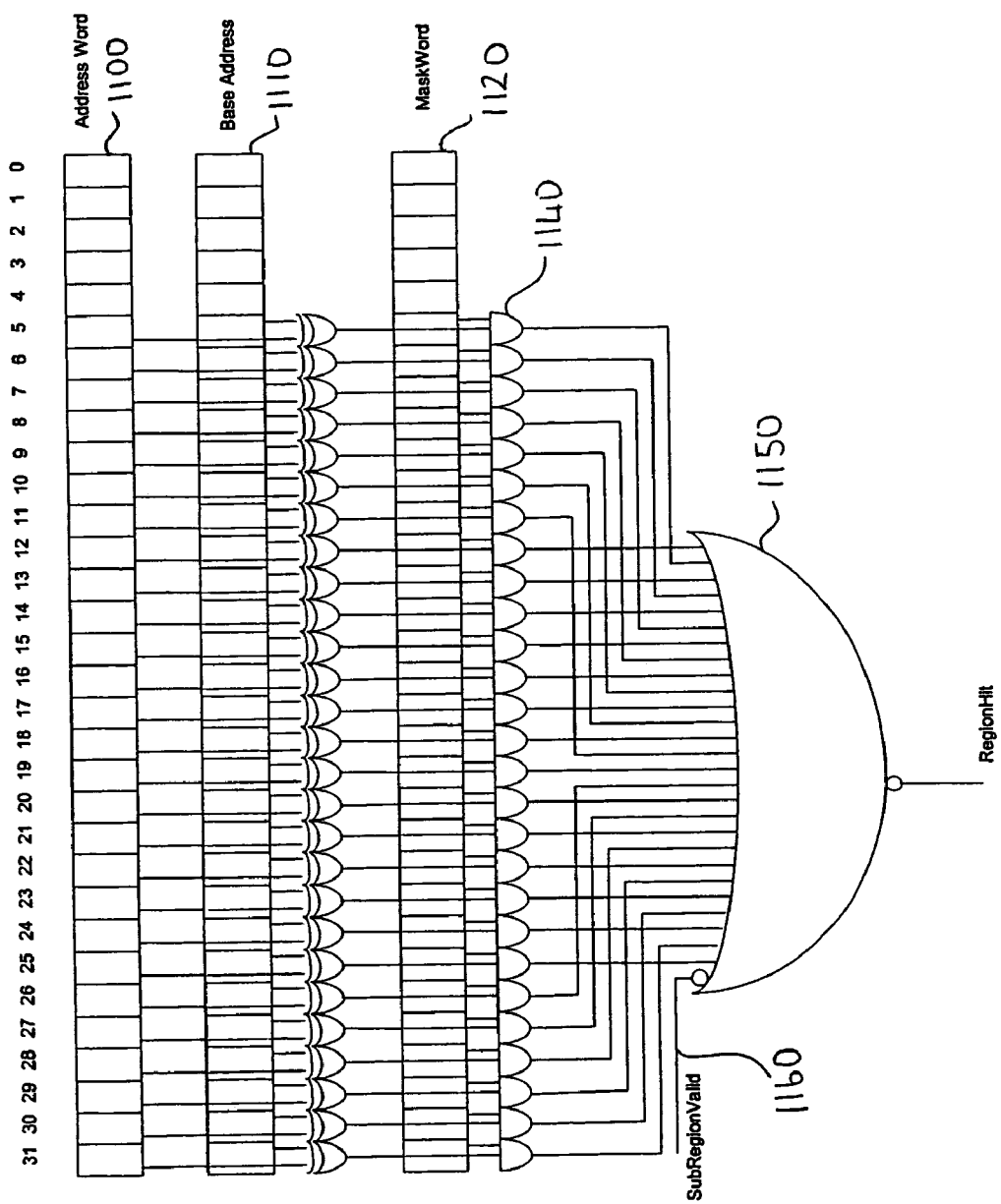
FIG. 11 schematically illustrates a portion of logic operable to determine a region hit for a member sub-region.

FIG. 11 schematically illustrates a logic arrangement operable to calculate a region hit value that indicates whether the memory attributes associated with a given memory region should be applied to the particular sub-region to which the current address word corresponds. Recall that the memory attributes will only be applied to those sub-regions that are member sub-regions. The arrangement comprises three 32-bit registers:—a current address word register 1100; a base address register 1110 and a mask word register 1120. The arrangement also comprises a series of twenty-seven exclusive OR (XOR) gates 1130, a series of 27 logical AND gates 1140 and a logical NOR gate 1150. Denoting the bits of the current address word 1100 by $A_i$, where i is an integer in the range 0 to 31 and the bits of the base address 1110 by $B_i$, then it can be seen that the series of XOR gates 1130 perform the calculation $A_i$ XOR $B_i$ for i=5 to 31. The series of AND gates receive, as first inputs, the outputs of respective XOR gates 1130 and as second inputs corresponding bits of the mask word $M_i$. Thus the logical operation performed by the AND gates 1140 is ($A_i$ XOR $B_i$) AND $M_i$ for i=5 to 31. The twenty-seven outputs of the series of AND gates 1140 are supplied as inputs to the NOR gate 1150. An additional input to the NOR gate 1150 is the sub-region valid bit as calculated by the arrangement of FIG. 6. Without the additional input of the sub-region valid bit the arrangement of FIG. 11 corresponds to a non-logic circuit that is used to indicate if the current address corresponds to the memory region associated with the given base address. However, inclusion of the sub-region valid bit input 1160 changes the function of this circuit such that it indicates both that the current address word represents an address that is in the memory region associated with the specified base address 1110 and that the particular sub-region to which the current address corresponds is a member sub-region. It can be seen that if the value of the sub-region valid bit is 1 then since its value is inverted on input into the NOR gate in order to achieve a region hit, corresponding to an output of 1 from the NOR gate 1150, it is necessary that the sub-region valid bit should have an input value of 1.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a memory operable to store data values;
   a memory protection unit operable to associate memory attributes with portions of said memory and to identify a plurality of memory regions corresponding to respective address ranges of said memory, said memory protection unit being operable to associate with at least one of said plurality of memory regions a respective memory region specifier comprising an attributes field for defining a set of memory attributes associated with said memory region and a sub-region field for holding a sub-region membership value that specifies for each of a plurality of sub-regions of said memory region whether respective sub-regions are member sub-regions or non-member sub-regions such that said memory attributes are applied to said member sub-regions but are not applied to said non-member sub-regions.

2. Apparatus as claimed in claim 1, in which said set of memory attributes comprise memory access permissions.

3. Apparatus as claimed in claim 1, in which said apparatus is operable in a plurality of levels including a user level and a privileged level and said memory access permissions specify in which of said plurality of levels of access is permitted.

4. Apparatus as claimed in claim 1, in which said memory attributes comprise an indication as to whether said member sub-regions are readable or writeable.

5. Apparatus as claimed in claim 1, in which said set of memory attributes comprises an indication of whether said member sub-regions are cacheable or non-cacheable.

6. Apparatus as claimed in claim 1, in which said set of memory attributes comprises an indication of whether said member sub-regions are bufferable or non-bufferable.

7. Apparatus as claimed in claim 1, in which said memory protection unit is operable to use said sub-region field to specify a plurality of contiguous member sub-regions.

8. Apparatus as claimed in claim 1, in which said memory protection unit is operable to use said sub-region field to specify a plurality of non-contiguous member sub-regions.

9. Apparatus as claimed in claim 1, in which said plurality of memory regions are overlapping memory regions.

10. Apparatus as claimed in claim 9, in which a given address range of said memory is specified by said sub-region field of one of said plurality of memory regions as a non-member sub-region and said given address range is also specified by a sub-region field corresponding to a different one of said plurality of member regions as a member sub-region.

11. Apparatus as claimed in claim 9, in which said data processing apparatus is operable to execute a plurality of different processing applications having respective memory address mappings and in which, when a context switch between execution of different ones of said plurality of different processing applications occurs, said memory protection unit is operable to update said sub-region field of at least one of said plurality of memory regions.

12. Apparatus as claimed in claim 11, in which said memory protection unit is operable to update said attributes field in the event of said context switch.

13. Apparatus as claimed in claim 1, in which said plurality of sub-regions regions of said memory region are of equal size.

14. Apparatus as claimed in claim 1, in which an address mask is used to identify an address-specifying portion of a current address word in dependence upon a size value specifying the size of said memory region, said current address word corresponding to a current memory location.

15. Apparatus as claimed in claim 14, comprising subregion validity logic operable to determine a sub-region valid value, said sub-region valid value specifying whether said current memory location is associated with one of said member sub-regions or one of said non-member sub-regions.

16. Apparatus as claimed in claim 15, in which said subregion validity logic is operable to use said address mask to identify from said current address word, the one of said plurality of sub-regions to which said current memory location belongs.

17. Apparatus as claimed in claim 16, in which said subregion validity logic is operable to calculate a set of select bits by logically combining bits from said address mask and bits from said current address word.

18. Apparatus as claimed in claim 17, in which said subregion validity logic is operable to calculate a set of final select bits by logically combining different ones of said set of select bits.

19. Apparatus as claimed in claim 18, in which said sub-region validity logic comprises permutation logic operable to permute said set of final select bits to calculate said sub-region valid value.

20. Apparatus as claimed in claim 18, in which said subregion validity logic comprises permutation logic operable to permute said sub-region membership value to calcuate said sub-region valid value.

21. Apparatus as claimed in claim 20, in which said permutation logic is operable to perfrom said permutation when writing said sub-region membership value to an operand store.

22. Apparatus as claimed in claim 21, in which said permutation logic comprises a single logic module and said single logic module is used to perform said permutation for each of said plurality of memory regions.

23. A method for processing data, said method comprising:

storing data values in a memory;

associating memory attributes with portions of said memory and identifying a plurality of memory regions corresponding to respective address ranges of said memory using a memory protection unit;

associating with at least one of said plurality of memory regions a respective memory region specifier comprising an attributes field for defining a set of memory attributes associated with said memory region and a sub-region field for holding a sub-region membership value that specifies for each of a plurality of sub-regions of said memory region whether respective sub-regions are member sub-regions or non-member sub-regions such that said memory attributes are applied to said member sub-regions but are not applied to said non-member sub-regions.

24. Apparatus for processing data, said apparatus comprising:

means for storing data values;

memory protection means for associating memory attributes with portions of said memory and to identify a plurality of memory regions corresponding to respective address ranges of said memory, said memory protection means being operable to associate with at least one of said plurality of memory regions a respective memory region specifier comprising an attributes field for defining a set of memory attributes associated with said memory region and a sub-region field for holding a sub-region membership value that specifies for each of a plurality of sub-regions of said memory region whether respective sub-regions are member sub-regions or non-member sub-regions such that said memory attributes are applied to said member sub-regions but are not applied to said non-member sub-regions.

\* \* \* \* \*